US010480328B2

(12) United States Patent
Weaver et al.

(10) Patent No.: US 10,480,328 B2
(45) Date of Patent: Nov. 19, 2019

(54) FORWARD FLOWING SERPENTINE VANE (71) Applicants: ROLLS-ROYCE CORPORATION, Indianapolis, IN (US); ROLLS-ROYCE NORTH AMERICAN TECHNOLOGIES, INC., Indianapolis, IN (US)

(72) Inventors: John Alan Weaver, Indianapolis, IN (US); Bradford John Riehle, Plainfield, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 265 days.

(21) Appl. No.: 15/414,103

(22) Filed: Jan. 24, 2017

(65) Prior Publication Data

US 2017/0211416 A1    Jul. 27, 2017

Related U.S. Application Data

(60) Provisional application No. 62/286,727, filed on Jan. 25, 2016.

(51) Int. Cl.
*F01D 5/18* (2006.01)
*F01D 25/12* (2006.01)
*F01D 9/04* (2006.01)

(52) U.S. Cl.
CPC .............. *F01D 5/187* (2013.01); *F01D 5/18* (2013.01); *F01D 9/041* (2013.01); *F01D 25/12* (2013.01); *F05D 2240/121* (2013.01); *F05D 2240/127* (2013.01); *F05D 2260/221* (2013.01); *F05D 2260/22141* (2013.01)

(58) Field of Classification Search
CPC . F01D 5/187; F01D 5/18; F01D 5/188; F01D 25/12; F01D 9/04; F01D 5/189; F01D 9/065; F01D 25/08
See application file for complete search history.

(56) References Cited

U.S. PATENT DOCUMENTS 4,312,624 A *  1/1982  Steinbauer, Jr. ........ F01D 5/189
                                                          415/115
4,930,980 A     6/1990  North et al.
(Continued)

FOREIGN PATENT DOCUMENTS

EP          0768448 A1      4/1997
EP          1010859 A2      6/2000
(Continued)

OTHER PUBLICATIONS

European Search Report for Application No. 17152667.6-1610, dated Jun. 6, 2017, 9 pages.

*Primary Examiner* — Bryan M Lettman
(74) *Attorney, Agent, or Firm* — Barnes & Thornburg LLP (57) ABSTRACT

A vane adapted for use in a gas turbine engine includes a forward following serpentine cooling path having a plurality of divider walls to direct cooling airflow. The serpentine cooling path optionally includes one or more bifurcating walls in the cooling path to split the airflow. The serpentine cooling path is in communication with an aft inlet in the vane and air passing through the serpentine cooling path exits a forward outlet in the vane into a forward rotor/stator cavity.

20 Claims, 6 Drawing Sheets

(56) References Cited

U.S. PATENT DOCUMENTS

| | | |
|---|---|---|
| 5,356,265 A | 10/1994 | Kercher et al. |
| 5,488,825 A | 2/1996 | Davis et al. |
| 6,357,999 B1 * | 3/2002 | Pearce ............... F01D 5/08 415/115 |
| 6,955,523 B2 | 10/2005 | McClelland |
| 7,090,461 B2 | 8/2006 | Liang |
| 7,281,895 B2 | 10/2007 | Liang |
| 7,530,789 B1 * | 5/2009 | Liang ............... F01D 5/186 415/115 |
| 7,534,089 B2 | 5/2009 | Liang |
| 7,717,675 B1 | 5/2010 | Liang |
| 7,785,072 B1 | 8/2010 | Liang |
| 7,967,567 B2 | 6/2011 | Liang |
| 8,011,881 B1 | 9/2011 | Liang |
| 8,096,772 B2 | 1/2012 | Liang |
| 8,105,031 B2 | 1/2012 | Trindade et al. |
| 8,167,559 B2 | 5/2012 | Liang |
| 8,221,055 B1 | 7/2012 | Liang |
| 8,328,518 B2 | 12/2012 | Liang et al. |
| 8,511,968 B2 | 8/2013 | Liang et al. |
| 8,535,006 B2 | 9/2013 | Lee |
| 8,628,294 B1 | 1/2014 | Liang |
| 8,702,375 B1 | 4/2014 | Liang |
| 8,757,961 B1 | 6/2014 | Liang |
| 8,757,974 B2 | 6/2014 | Propheter-Hinckley et al. |
| 8,821,111 B2 | 9/2014 | Gear et al. |
| 8,827,632 B1 | 9/2014 | Lee et al. |
| 8,870,524 B1 | 10/2014 | Liang |
| 2002/0085908 A1 * | 7/2002 | Tiemann ............... F01D 5/188 415/115 |
| 2003/0002979 A1 | 1/2003 | Koschier |
| 2005/0031445 A1 | 2/2005 | McClelland |
| 2009/0081029 A1 | 3/2009 | Dalton et al. |
| 2013/0251539 A1 | 9/2013 | Gautschi et al. |

FOREIGN PATENT DOCUMENTS

| | | | |
|---|---|---|---|
| EP | 1469164 A2 | | 10/2001 |
| WO | WO2014105515 | * | 7/2014 |

* cited by examiner

FORWARD FLOWING SERPENTINE VANE

CROSS REFERENCE TO RELATED APPLICATIONS

This application claims priority to and the benefit of U.S. Provisional Patent Application No. 62/286,727 filed 25 Jan. 2016, the disclosure of which is now expressly incorporated herein by reference.

FIELD OF THE DISCLOSURE

The present disclosure relates generally to vanes used in gas turbine engines, and more specifically to a vane with a serpentine cooling passage that directs airflow to one or more rotor/stator cavities.

BACKGROUND

Engines, and particularly gas turbine engines, are used to power aircraft, watercraft, power generators and the like. Gas turbine engines typically include a compressor, a combustor, and a turbine. The compressor compresses aft drawn into the engine and delivers high pressure aft to the combustor. The combustor is a component or area of a gas turbine engine where combustion takes place, hi a gas turbine engine, the combustor receives high pressure air and adds fuel to the air which is burned to produce hot, high-pressure gas. After burning the fuel, the hot, high-pressure gas is passed from the combustor to the turbine. The turbine extracts work from the hot, high-pressure gas to drive the compressor and residual energy is used for propulsion or sometimes to drive an output shaft.

Turbines typically include static vanes that redirect hot, high-pressure air moving from the combustor through the turbine and rotating blades that extract mechanical energy from the hot, high pressure air. Cooling airflow is often used to prevent vane fatigue from the heat applied to the vanes by the hot, high pressure air. Not only do the vanes themselves become hot, but the cavities forward and aft the rotor support that contain the turbine wheel are required to be maintained below a particular temperature. By circulating cooling airflow through the interior of the vane, the air may be purged into the rotor/stator cavities to cool multiple components in the system.

Typical aft circulation in a vane occurs via an impingement tube design that results in aftward flow on the inside of the vane, exiting the trailing edge of a vane. This does not lend itself to using the vane cooling air to purge rotor/stator cavities below the vane as any air purged at the leading edge has not done any cooling on the vane prior to exiting into the cavity. Moreover, designs incorporating turbulator ribs in the vane may provide too much cooling to the vane prior to the air being purged, so that the purged air is too warm to adequately cool the rotor/stator cavities.

Accordingly, new techniques and configurations are needed to tailor the temperature of cooling fluid passed through vanes into rotor/stator cavities experiencing high-temperature environments.

SUMMARY

The present disclosure may comprise one or more of the following features and combinations thereof.

A vane may comprise an outer platform, an inner platform, and an airfoil that extends from the outer platform to the inner platform in a radial direction. The airfoil has a leading edge and a trailing edge and includes a serpentine cooling passage with an inlet arranged through the outer platform adjacent to the trailing edge of the airfoil and an outlet arranged through the inner platform adjacent to the leading edge of the airfoil so that cooling air supplied to the inlet moves toward the leading edge of the airfoil during use in a gas turbine engine.

In some embodiments, the airfoil includes an outer skin and a plurality of interior divider walls that define at least an aft chamber arranged adjacent to the trailing edge of the airfoil, a forward chamber arranged adjacent to the leading edge of the airfoil, and a middle chamber arranged between the aft chamber and the forward chamber. The aft chamber is fluidly coupled to the middle chamber adjacent to the inner platform and the forward chamber is fluidly coupled to the middle chamber adjacent to the outer platform to provide the serpentine cooling passage.

In some embodiments, the vane includes an outlet arranged through the inner platform of the vane adjacent to the trailing edge of the airfoil so that a portion of the cooling air supplied to the inlet exits the outlet adjacent to the trailing edge of the airfoil during use in a gas turbine engine.

In some embodiments, the middle chamber of the vane further comprises a bifurcation wall that separates cooling air passing through the middle chamber into suction side and pressure side passages.

In some embodiments, the pressure side passage has smooth walls and the suction side passage has turbulator ribs to increase heat transfer to air that flows through the suction side passage.

In some embodiments, the pressure side passage has turbulator ribs of a first geometry and the suction side passage has turbulator ribs of a second geometry, wherein the first geometry is different than the second geometry.

In some embodiments, the outlet arranged through the inner platform comprises a nozzle with a preswirl feature.

In some embodiments, the airfoil includes an outer skin and a plurality of interior walls that define at least an upper chamber arranged adjacent to the outer platform edge of the vane, a lower chamber arranged adjacent to inner platform of the vane, and a central chamber arranged between the upper chamber and the lower chamber.

In some embodiments, the upper chamber is fluidly coupled to the central chamber adjacent to the leading edge and the lower chamber is fluidly coupled to the central chamber adjacent to the trailing edge to provide the serpentine cooling passage.

According to another aspect of the present disclosure, a system may include a vane having an outer platform, an inner platform, and an airfoil that extends from the outer platform to the inner platform in a radial direction. The airfoil includes a leading edge, a trailing edge, and a serpentine cooling passage with an aft inlet arranged through the outer platform adjacent to the trailing edge of the airfoil. A forward inlet arranged is through the outer platform adjacent to the forward edge of the airfoil, and an outlet arranged through the inner platform adjacent to the leading edge of the airfoil so that cooling air supplied to each inlet moves toward the leading edge of the airfoil during use in a gas turbine engine.

In some embodiments, the forward purge outlet further comprises a nozzle with a preswirl feature.

In some embodiments, the system includes an aft outlet in the inner platform of the vane configured to direct a portion of the cooling air from the aft inlet into an aft stator cavity.

In some embodiments, the serpentine cooling passage includes a plurality of divider walls and a bifurcation wall perpendicular to the plurality of divider walls.

In some embodiments, the plurality of divider walls extend from the leading edge and the trailing edge of the airfoil and define at least an upper chamber arranged adjacent to the outer platform edge of the vane, a lower chamber arranged adjacent to inner platform of the vane, and a central chamber arranged between the upper chamber and the lower chamber.

In some embodiments, the plurality divider walls extend from the outer platform and inner platform and define at least an aft chamber arranged adjacent to the trailing edge of the airfoil, a forward chamber arranged adjacent to the leading edge of the airfoil, and a middle chamber arranged between the aft chamber and the forward chamber.

In some embodiments, the bifurcation wall is arranged in the middle chamber and separates cooling passing through the middle chamber into suction side and pressure side passages.

According to another aspect of the present disclosure, a method for cooling a stator cavity beneath a vane in a gas turbine engine is provided. The method may include providing a vane having an outer platform, an inner platform and an airfoil extending from the outer platform to the inner platform, directing cooling air into an inlet arranged through the outer platform adjacent to the trailing edge of the airfoil in communication with a serpentine cooling passage, moving the cooling air through the serpentine cooling passage in the interior of the airfoil, and providing a forward outlet in communication with the serpentine cooling passage arranged through the inner platform adjacent to the leading edge of the airfoil so that the cooling air exits the vane into a forward stator cavity of a gas turbine engine.

In some embodiments, the method includes dividing the cooling via a bifurcation wall in the serpentine cooling passage.

In some embodiments, the forward outlet is a preswirl nozzle.

In some embodiments, the method includes cooling an aft stator cavity via an aft purge outlet in the inner platform adjacent to the trailing edge of the vane These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
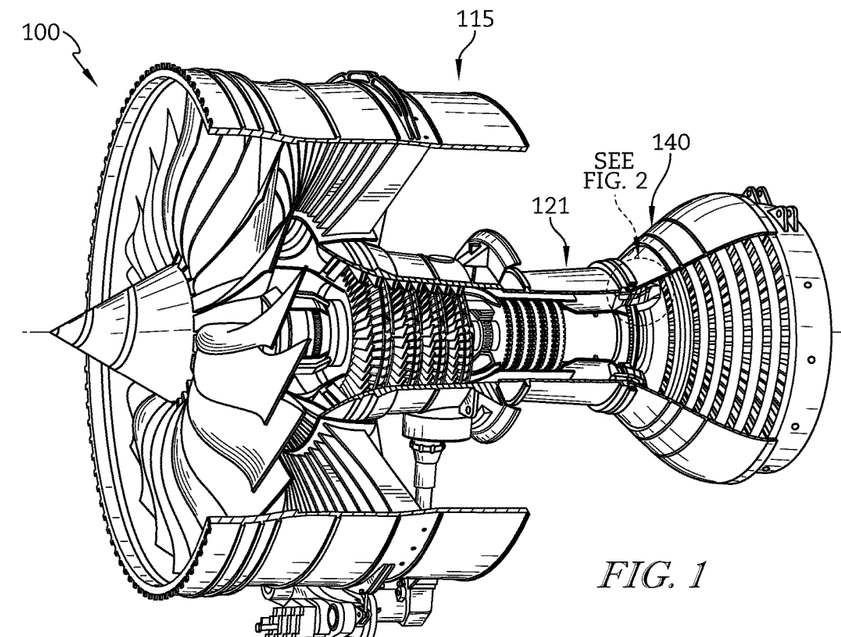
FIG. 1 is a perspective cut-away view of a turbine engine showing that the engine includes a turbine arranged aft of a compressor, and a combustor to receive hot, high pressure air produced in the compressor and combustor.

The arrangement of an illustrative vane 10 in a gas turbine engine 100 is shown in FIG. 1. The gas turbine engine 100 includes a compressor 115, a combustor 121, and a turbine 140 housing a plurality of vanes 10. An output shaft is driven by the turbine 140 and may drive a propeller, a gearbox, a pump, or fan depending on the application of the gas turbine engine 100.

Figure 2:
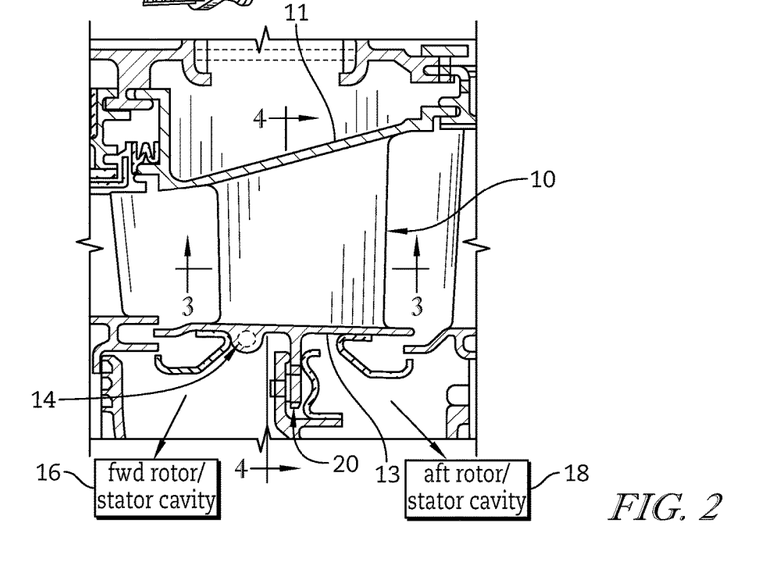
FIG. 2 is a sectional view of a portion of the turbine of FIG. 1 showing a vane is mounted via a rotor support and may optionally have a preswirl nozzle exiting into a rotor/stator cavity.

The vane 10 is located in the turbine and secured via a rotor support 20 to a disk (not shown) that defines a forward rotor/stator cavity 16 and an aft rotor/stator cavity 18 beneath the vane blade 10 as seen in FIG. 2. In some embodiments, trailing edge or other film cooling holes (not shown) may be machined in the airfoil surface. Vane 10 includes an outer platform 11, inner platform, 13, and airfoil blade 10 extending therebetween.

Figure 3:
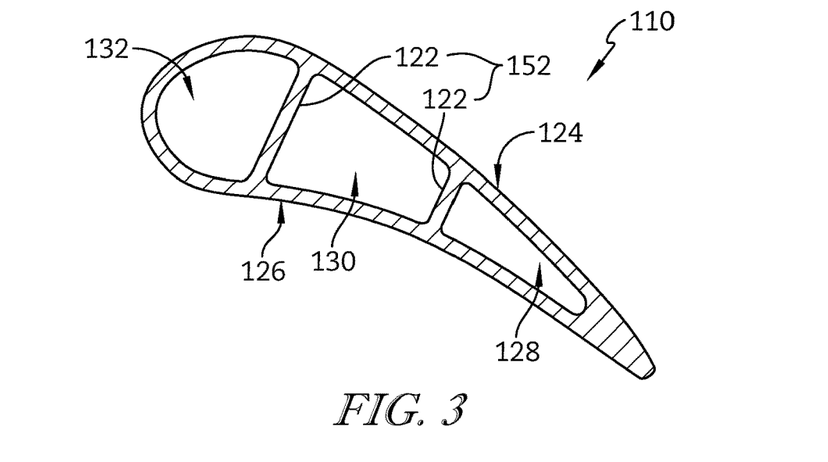
FIG. 3 is a cross-sectional view of the vane in FIG. 2 taken along line 3-3 showing a serpentine cooling passage through the vane.

The vane 110 includes a plurality of divider walls 122 that extend from the suction side 124 to the pressure side 126 of the vane interior. The divider walls 122 divide the vane interior into a forward chamber 132, a middle chamber 130, and an aft chamber 128. The divider walls 122 form a serpentine cooling passage 152 through the body of the vane 110 through which cooling airflow is passed.

Figure 4:
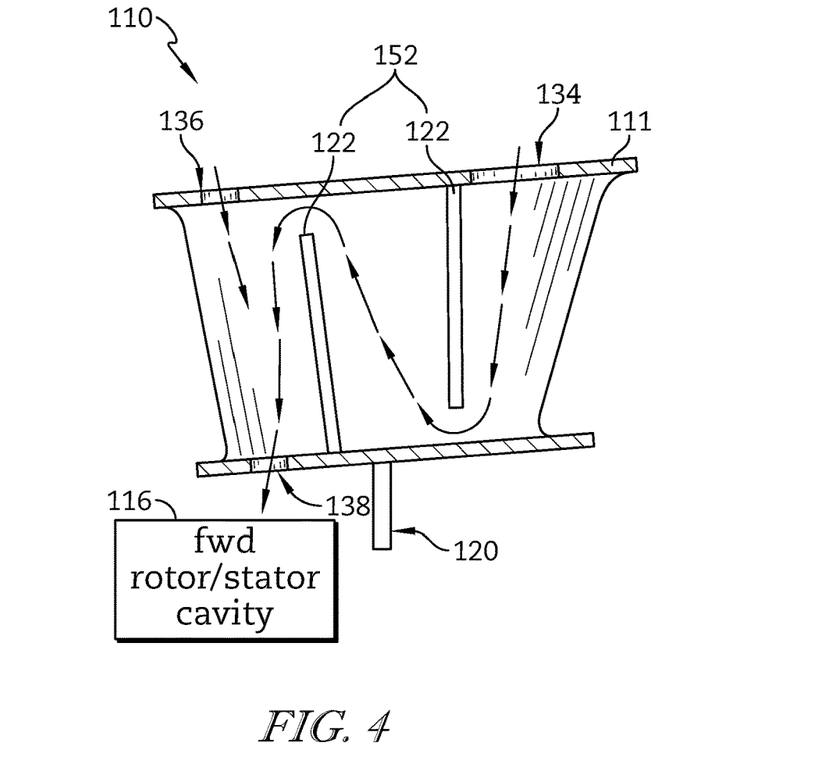
FIG. 4 is a cross-sectional view of the vane of FIGS. 2 and 3 taken along the line 4-4 of FIG. 2 showing that the vane forms a serpentine cooling passage and a forward purge for discharging cooling air into a forward cavity.

As can be seen in FIG. 4, the serpentine cooling passage 152 is in fluid communication with a forward air inlet 136 arranged through the outer platform 111 adjacent to the leading edge of the airfoil blade, an aft air inlet 134 arranged through the outer platform 111 adjacent to the trailing edge of the airfoil blade, and a forward rotor/stator purge outlet 138. Cooling air enters the aft air inlet 134 at the trailing end of outer platform 111 of the vane 110 and travels along the serpentine cooling passage in the vane body created by the divider walls 122 cooling the vane as it flows towards the forward cavity 132. Cooling air enters the forward air inlet 136 at the leading top edge of the vane and mixes with the flow that has traveled through the blade from the aft air inlet 134. The combined warmed and cool air exits the forward purge outlet 138 and enters the forward rotor/stator cavity 116 to cool it.

Figure 4A:
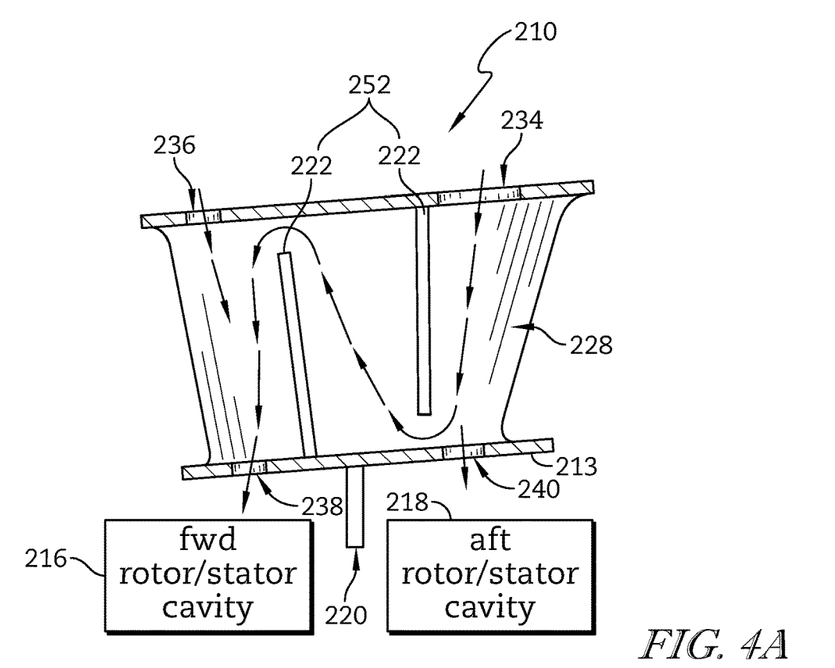
FIG. 4A is a cross-sectional view of another vane similar to the vane of FIGS. 2-4 showing that the vane forms a serpentine cooling passage, a forward purge for discharging cooling air into a forward cavity, and an aft purge for discharging cooling air into an aft cavity.

Another illustrative vane 210 adapted for use in the gas turbine engine 100 is show in FIG. 4A. The vane 210 is substantially similar to the vane 10 show in in FIGS. 1-4 described herein. Accordingly, similar reference numbers in the 200 series not specifically discussed herein indicate features that are common between vane 10 and vane 210. The description of the vane 10 is hereby incorporated by reference to apply to the vane 210 except in instances where it conflicts with the specific description and drawings of vane 210.

Unlike the vane 10, vane 210 includes an aft purge 240. Aft purge is located in an inner platform 213 of vane 210 exiting the aft chamber 228. Therefore a portion of the cooling airflow entering the aft chamber 228 via aft inlet 234 is bled off into an aft rotor/stator cavity 218. This results in cooling air exiting into both forward and aft rotor/stator cavities 216, 218.

Figure 4B:
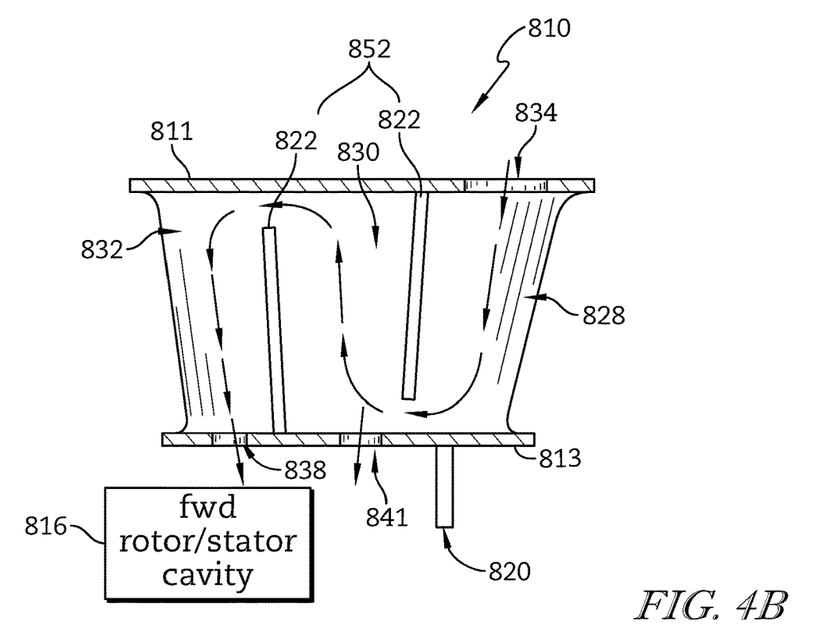
FIG. 4B is a cross-sectional view of another vane similar to the vane of FIGS. 2-4 showing that the vane forms a serpentine cooling passage, a forward purge for discharging cooling air into a forward cavity, and an additional forward purge for discharging cooling air into the forward cavity.

Another illustrative vane 810 adapted for use in the gas turbine engine 100 is show in in FIG. 4B. The vane 810 is substantially similar to the vane 10 show in in FIGS. 1-4 described herein. Accordingly, similar reference numbers in the 800 series not specifically discussed herein indicate features that are common between vane 10 and vane 810. The description of the vane 10 is hereby incorporated by reference to apply to the vane 810 except in instances where it conflicts with the specific description and drawings of vane 810.

Unlike the vane 10, vane 810 includes an additional forward purge 841 and does not have a forward inlet 136. The additional, or second, forward purge 841 is located in an inner platform 813 of vane 810 exiting the middle chamber 830. Therefore, a portion of the cooling airflow entering the aft chamber 828 via aft inlet 834 is bled off into a forward rotor/stator cavity 816 at the middle chamber 830 and a portion of the cooling airflow entering the aft chamber 828 via aft inlet 834 is bled off into the forward rotor/stator cavity 816 at a forward cavity 832.

Figures 5, 6, 6A:
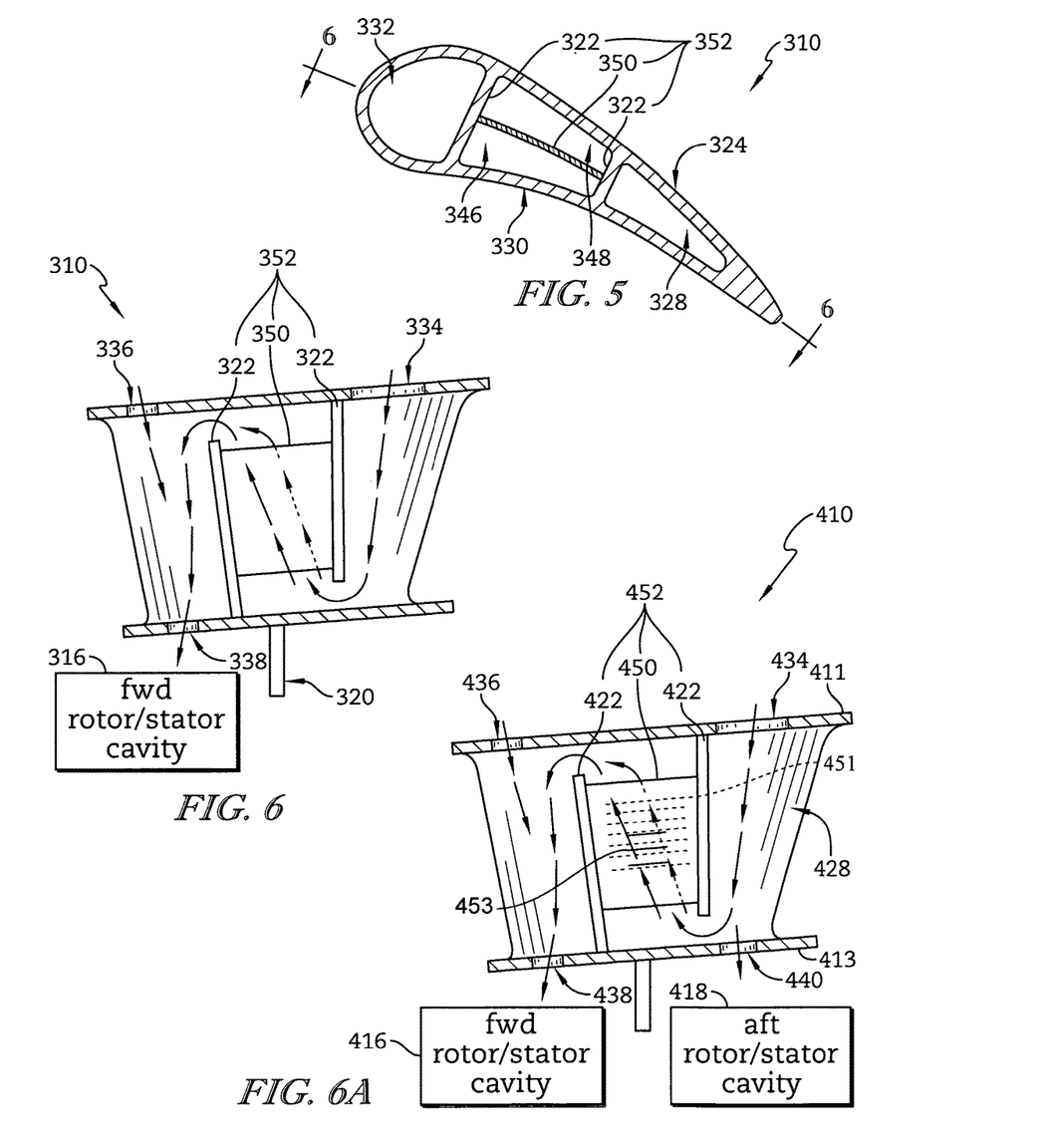
FIG. 5 is a cross-sectional view of yet another vane adapted for use in a turbine like that of FIG. 2, showing a bifurcated serpentine cooling passage through the vane.
FIG. 6 is a cross-sectional view of the vane of FIG. 5 taken along the line 6-6 showing the vane with a bifurcated serpentine cooling passage and a forward purge for discharging cooling air into a forward cavity.
FIG. 6A is a cross-sectional view of another vane similar to the vane of FIG. 6 showing the vane with a bifurcated serpentine cooling passage, a forward purge for discharging cooling air into a forward cavity, and an aft purge for discharging cooling air into an aft cavity.

Another illustrative vane 310 adapted for use in the gas turbine engine 100 is show in in FIG. 5. The vane 310 is substantially similar to the vane 10 show in FIGS. 1-3 described herein. Accordingly, similar reference numbers in the 300 series not discussed herein indicate features that are common between vane 10 and vane 310. The description of the vane 10 is hereby incorporated by reference to apply to the vane 310 except in instances where it conflicts with the specific description and drawings of vane 310.

Unlike vane 10, vane 310 includes a bifurcating wall 350 extending between and connecting divider walls 322. Bifurcating wall 350 is located in the middle chamber 330 and divides the middle passage into a pressure side passage 346 and a suction side passage 348. Bifurcating wall 350, and divider walls 322 form a bifurcated serpentine cooling passage 352 as best seen in FIG. 6. The bifurcated serpentine cooling passage 352 directs airflow from the aft chamber 328 to split into the suction passage 348 and the pressure passage 346 before remixing in the forward chamber 332. The remixed air is then mixed with flow entering forward inlet 336 and the combined air exits forward purge outlet 338 into forward rotor/stator cavity 316.

Another illustrative vane 410 adapted for use in the gas turbine engine 100 is show in in FIG. 6A. The vane 410 is substantially similar to the vane 310 show in in FIGS. 1-2, and 5-6 described herein. Accordingly, similar reference numbers in the 300 series not specifically discussed herein indicate features that are common between vane 310 and vane 410. The description of the vane 310 is hereby incorporated by reference to apply to the vane 410 except in instances where it conflicts with the specific description and drawings of vane 410.

Unlike the vane 310, vane 410 includes an aft purge outlet 440. Aft purge 440 is located in an inner platform 413 of vane 410 exiting the aft chamber 428. Therefore a portion of the cooling airflow entering the aft chamber 428 via aft inlet 434 is bled off into an aft rotor/stator cavity 418. This results in cooling air exiting into both forward and aft rotor/stator cavities 416, 418.

Figure 7:
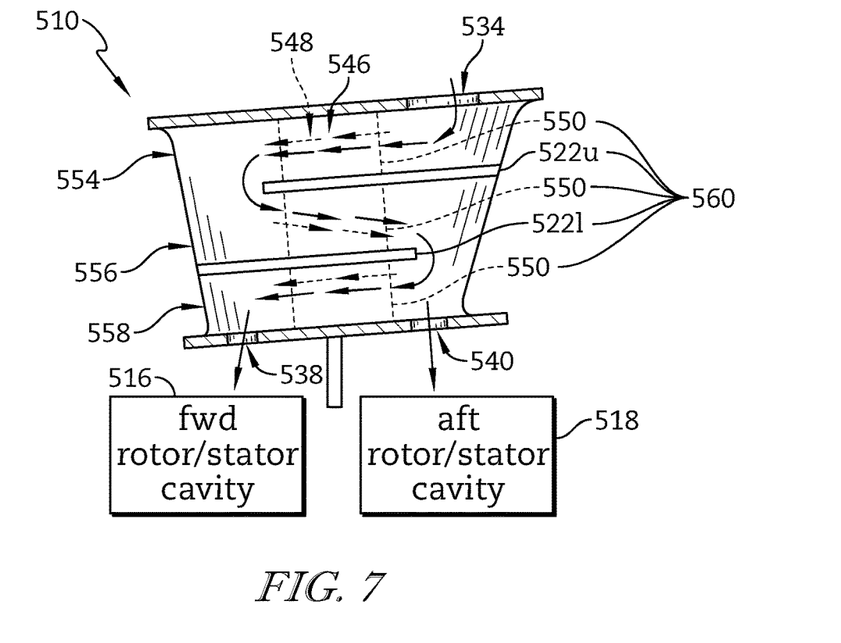
FIG. 7 is a cross-sectional view of the vane of yet another vane adapted for use in a turbine like that of FIG. 2, showing the vane with a horizontal bifurcated serpentine cooling passage, a forward purge for discharging cooling air into a forward cavity, and an aft purge for discharging cooling air into an aft cavity.

Another illustrative vane 510 adapted for use in the gas turbine engine 100 is show in in FIG. 7. The vane 510 is substantially similar to the vane 410 show in in FIGS. 1-2, and 5-6 described herein. Accordingly, similar reference numbers in the 500 series not specifically discussed herein indicate features that are common between vane 310 and vane 510. The description of the vane 310 is hereby incorporated by reference to apply to the vane 510 except in instances where it conflicts with the specific description and drawings of vane 510.

The vane includes a serpentine cooling passage 560, which is a horizontal serpentine cooling passage. The horizontal bifurcated serpentine passage 560 includes two divider walls 522 and optionally includes one or more bifurcating walls 550. A first upper divider wall 522$u$ extends from an aft wall axially along the vane. A second lower divider wall 522$l$ extends from a forward wall parallel to and below the first wall. First and second walls 522 divide the vane 510 into upper chamber 554, central chamber 556, and lower chamber 558.

Three bifurcating walls 550 connect the upper wall of the vane to the first upper divider wall 522$u$, the first dividing wall to the second divider wall 522$l$, and the second lower divider wall 522$l$ to the bottom wall of the vane 510 along a central axis. The bifurcating walls 550 provide suction passage 548 and the pressure passage 546 in each of the upper 554, central 556, and lower 558 chambers.

As depicted, the vane has both forward purge outlet 538 and aft purge outlet 540, but may be configured to have only forward purge outlet 538. Likewise, vane 510 as depicted does not have a forward inlet, but may have one similar to forward inlet 336 shown in FIG. 6.

Figure 7A:
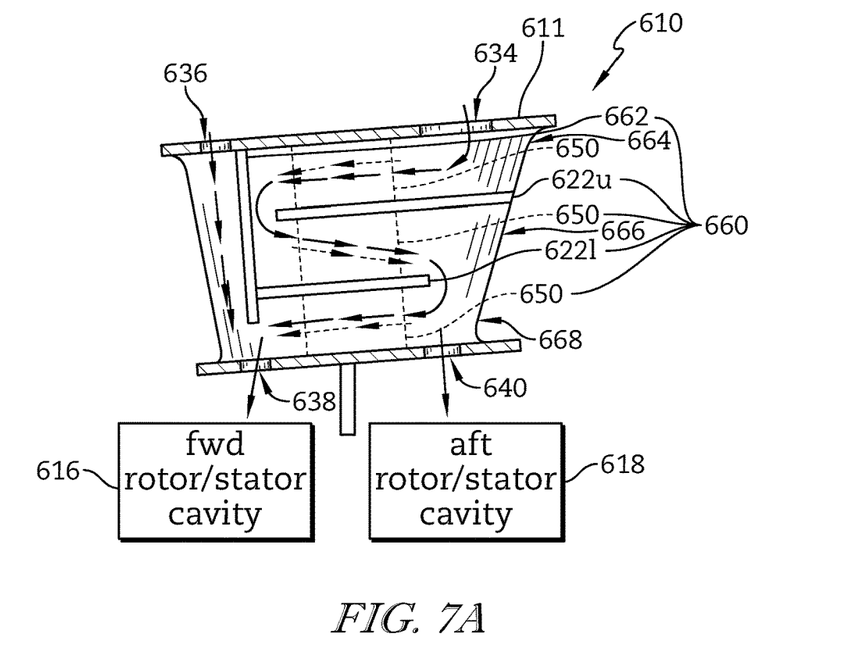
FIG. 7A is a cross-sectional view of the vane of yet another vane adapted for use in a turbine like that of FIG. 2, showing the vane with a horizontal bifurcated serpentine cooling passage having a supplemental inlet forward a dividing rib, a forward purge for discharging cooling air into a forward cavity, and an aft purge for discharging cooling air into an aft cavity.

Another illustrative vane 610 adapted for use in the gas turbine engine 100 is show in in FIG. 7A. The vane 610 is substantially similar to the vane 510 show in in FIG. 7 described herein. Accordingly, similar reference numbers in the 600 series not specifically discussed herein indicate features that are common between vane 610 and vane 510. The description of the vane 510 is hereby incorporated by reference to apply to the vane 610 except in instances where it conflicts with the specific description and drawings of vane 610.

Unlike vane 510, vane 610 includes a vertical divider wall 662. Vertical divider wall 662 extends from the outer platform 611 into the lower chamber 668 without contacting the first upper divider wall 622u. The second lower horizontal divider wall 622l extends from the vertical divider wall 662, and does not contact the aft wall. Therefore, airflow passing through the bifurcated serpentine cooling passage 660 has a shorter path. Additionally a forward inlet 636 at the forward top wall of the vane allows bypass air to enter and bypass the upper and central chambers 664, 666. The bypass air mixes with air flowing through the bifurcated serpentine cooling passage 660 at the lower chamber 668 and exits the forward purge outlet 638.

Figure 7B:
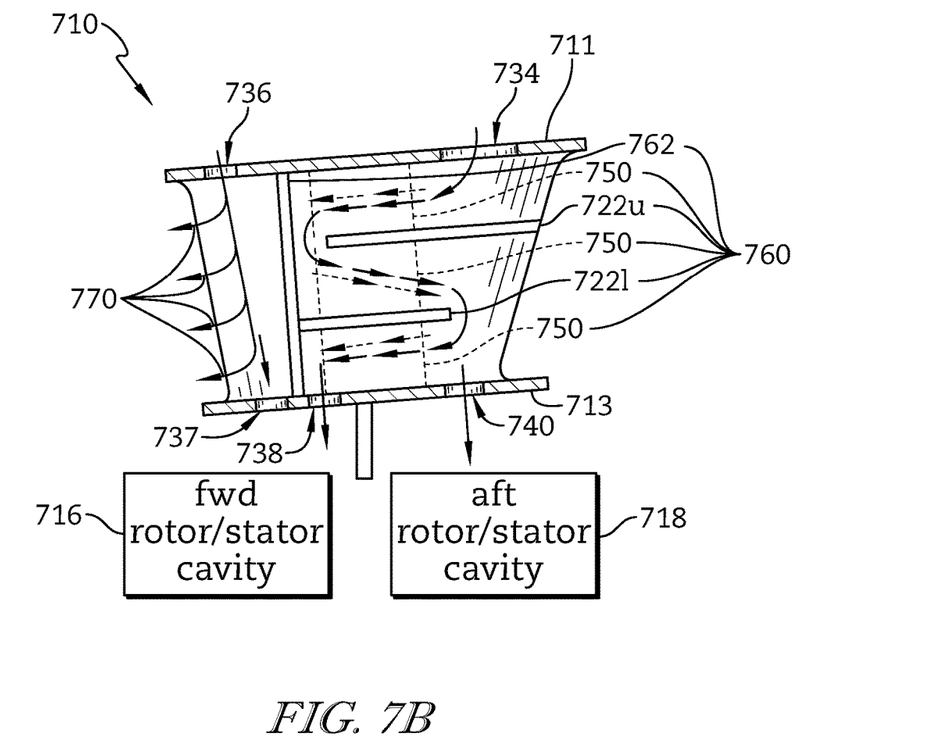
FIG. 7B is a cross-sectional view of the vane of yet another vane adapted for use in a turbine like that of FIG. 2, showing the vane with a horizontal bifurcated serpentine cooling passage having a supplemental inlet aft a dividing rib, a forward purge for discharging cooling air into a forward cavity, and an aft purge for discharging cooling air into an aft cavity.

Another illustrative vane 710 adapted for use in the gas turbine engine 100 is show in in FIG. 7B. The vane 710 is substantially similar to the vane 610 show in in FIG. 7A described herein. Accordingly, similar reference numbers in the 700 series not specifically discussed herein indicate features that are common between vane 710 and vane 610. The description of the vane 610 is hereby incorporated by reference to apply to the vane 710 except in instances where it conflicts with the specific description and drawings of vane 710.

Unlike vane 610, vertical dividing wall 762 extends from outer platform 711 of vane 710 to inner platform 713 so that the bifurcated serpentine cooling passage 760 does not communicate with forward inlet 736. Vertical dividing wall 762 shortens the path of airflow along the bifurcated serpentine cooling passage 760 leading to a forward outlet 738. Forward inlet 736 is in communication with leading edge outlets 770 and forward outlet 737. Forward rotor cavity 716 receives cooling air from forward outlet 737 and forward outlet 738.

All of the vanes detailed above may optionally have a preswirl nozzle 14 at the forward purge connecting the serpentine cooling passage in the vane 10 with the forward rotor/stator cavity 16. The preswirl nozzle accelerates the air flow exiting the vane.

The bifurcating walls permit varied wall geometries on the suction side and the pressure side of the vane interior to accommodate the different cooling requirements of the suction side compared with the pressure side of the vane. For example, a higher heat transfer to the cooling air adjacent to the suction side of the airfoil and a lower heat transfer to the cooling air on the pressure side may be achieved by using turbulator ribs 451, 453 having different geometries on each side. In another example, the pressure side may just have a smooth wall with turbulator ribs 451 on the suction side of the vane. The resulting mixed flow average temperature has a cooler temperature than air passed through a middle passage without a bifurcating wall. Similarly, varying the air inlet location along the top of a vane along with the vertical dividing wall adjusts the length of time cooling air is heated along the serpentine cooling passage.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane adapted for use in a gas turbine engine, the vane comprising an outer platform,
an inner platform, and
an airfoil that extends from the outer platform to the inner platform in a radial direction, the airfoil having a leading edge and a trailing edge and being formed to include a serpentine cooling passage with an inlet arranged through the outer platform at the trailing edge of the airfoil and an outlet arranged through the inner platform adjacent to the leading edge of the airfoil so that cooling air supplied to the inlet moves toward the leading edge of the airfoil during use in the gas turbine engine.

2. The vane of claim 1, wherein the airfoil includes an outer skin and a plurality of interior divider walls that define at least an aft chamber arranged adjacent to the trailing edge of the airfoil, a forward chamber arranged adjacent to the leading edge of the airfoil, and a middle chamber arranged between the aft chamber and the forward chamber.

3. The vane of claim 2, wherein the aft chamber is fluidly coupled to the middle chamber adjacent to the inner platform and the forward chamber is fluidly coupled to the middle chamber adjacent to the outer platform to provide the serpentine cooling passage.

4. The vane of claim 3, wherein the bifurcation wall extends axially between a first divider wall separating the aft chamber from the middle chamber and a second divider wall separating the middle chamber from the forward chamber and the bifurcation wall is spaced apart radially from both the inner platform and the outer platform.

5. The vane of claim 2, wherein the middle chamber further comprises a bifurcation wall that separates cooling air passing through the middle chamber into suction side and pressure side passages.

6. The vane of claim 5, wherein the pressure side passage has smooth walls and the suction side passage has turbulator ribs to increase heat transfer to air that flows through the suction side passage.

7. The vane of claim 5, wherein the pressure side passage has turbulator ribs of a first geometry and the suction side passage has turbulator ribs of a second geometry, wherein the first geometry is different than the second geometry.

8. The vane of claim 2, wherein the aft chamber is fluidly coupled to the middle chamber adjacent to the inner platform by a first passageway that extends from the aft chamber to the middle chamber within the serpentine cooling passage and the forward chamber is fluidly coupled to the middle chamber adjacent to the outer platform by a second passageway that extends from the middle chamber to the forward chamber within the serpentine cooling passage to provide the serpentine cooling passage.

9. The vane of claim 1, wherein the outlet arranged through the inner platform comprises a nozzle with a preswirl feature.

10. The vane of claim 1, wherein the airfoil includes an outer skin and a plurality of interior walls that define at least an upper chamber arranged adjacent to the outer platform edge of the vane, a lower chamber arranged adjacent to inner platform of the vane, and a central chamber arranged between the upper chamber and the lower chamber.

11. The vane of claim 10, wherein the upper chamber is fluidly coupled to the central chamber adjacent to the leading edge and the lower chamber is fluidly coupled to the central chamber adjacent to the trailing edge to provide the serpentine cooling passage.

12. A system for cooling stator cavities below a vane comprising
the vane having an outer platform, an inner platform, and an airfoil that extends from the outer platform to the inner platform in a radial direction, the airfoil having a leading edge and a trailing edge and being formed to include a serpentine cooling passage with an aft inlet arranged through the outer platform at the trailing edge of the airfoil, a forward inlet arranged through the outer platform adjacent to the forward edge of the airfoil, and an outlet arranged through the inner platform adjacent to the leading edge of the airfoil so that cooling air supplied to each inlet moves toward the leading edge of the airfoil during use in a gas turbine engine.

13. The system of claim 12, wherein the outlet further comprises a nozzle with a preswirl feature.

14. The system of claim 12, further comprising an aft outlet in the inner platform of the vane configured to direct a portion of the cooling air from the aft inlet into an aft stator cavity.

15. The system of claim 12, wherein the serpentine cooling passage includes a plurality of divider walls and a bifurcation wall perpendicular to the plurality of divider walls.

16. The system of claim 15, wherein the plurality of divider walls extend from the leading edge and the trailing edge of the airfoil and define at least an upper chamber arranged adjacent to the outer platform edge of the vane, a lower chamber arranged adjacent to inner platform of the vane, and a central chamber arranged between the upper chamber and the lower chamber.

17. The system of claim 15, wherein the plurality divider walls extend from the outer platform and inner platform and define at least an aft chamber arranged adjacent to the trailing edge of the airfoil, a forward chamber arranged adjacent to the leading edge of the airfoil, and a middle chamber arranged between the aft chamber and the forward chamber.

18. The system of claim 17 wherein the bifurcation wall is arranged in the middle chamber and separates cooling air passing through the middle chamber into suction side and pressure side passages.

19. The system of claim 15, wherein the serpentine cooling passage is defined entirely, radially between the inner platform and the outer platform.

20. The system of claim 12, wherein the airfoil includes an outer skin and at least one interior divider wall extending radially between the inner platform and the outer platform and defining an aft chamber directly between the trailing edge of the airfoil and the first divider wall and the inlet of the serpentine cooling passage opens into the aft chamber.

* * * * *